United States Patent [19]

Mooney et al.

[11] Patent Number: 5,799,106
[45] Date of Patent: Aug. 25, 1998

[54] NOISE IMMUNE AUTOMATED CONTRAST CONTROL FOR INFRARED CAMERAS

[75] Inventors: Jonathan M. Mooney, Winchester; Jerry Silverman, Newton; Steven DiSalvo, Chelmsford, all of Mass.

[73] Assignee: The United States of America as represented by the Secretary of the Air Force, Washington, D.C.

[21] Appl. No.: 113,872

[22] Filed: Aug. 27, 1993

Related U.S. Application Data

[63] Continuation-in-part of Ser. No. 728,907, Jul. 9, 1991, Pat. No. 5,249,241.

[51] Int. Cl.$^6$ .................................................. G06K 9/00
[52] U.S. Cl. ............................................ 382/172; 382/273
[58] Field of Search .............................. 382/18, 51, 54, 382/30, 191, 270, 273, 172, 209, 312, 321; 250/316.1

[56] References Cited

U.S. PATENT DOCUMENTS

| | | | |
|---|---|---|---|
| 4,656,665 | 4/1987 | Pennebaker | 382/51 |
| 4,670,653 | 6/1987 | McConkle et al. | 250/330 |
| 4,719,350 | 1/1988 | Alm | 250/330 |
| 4,741,046 | 4/1988 | Matsunawa et al. | 382/9 |
| 4,799,247 | 1/1989 | Annis et al. | 378/87 |
| 4,856,528 | 8/1989 | Yang et al. | 128/653 |
| 4,868,651 | 9/1989 | Chou et al. | 378/98.7 |
| 4,979,136 | 12/1990 | Weiman et al. | 364/572 |
| 5,022,062 | 6/1991 | Annis | 378/86 |
| 5,034,991 | 7/1991 | Hagimae et al. | 382/30 |
| 5,063,607 | 11/1991 | FitzHenry et al. | 382/50 |
| 5,179,581 | 1/1993 | Annis | 378/57 |
| 5,239,378 | 8/1993 | Tsuji et al. | 382/18 |

*Primary Examiner*—Joseph Mancuso
*Attorney, Agent, or Firm*—William G. Auton

[57] ABSTRACT

Plateau Equalization (PE), automatically optimizes, tracks changes in luminance, and adjusts in real time the display of wide dynamic range imagery from infrared cameras. The PE approach includes an automated contrast control system which uses an infrared camera, a microprocessor, and an 8 bit monitor to display the IR scenes with automatic control of the contrast of the IR data. This system allows 8 bit monitors to be used with 12 bit cameras. The camera acquires IR data which is digitized for the microprocessor. The microprocessor processes the IR data with a plateau equalization program to output digital IR data for the monitor with controlled contrast. The monitor displays the output of the microprocessor. Plateau Equalization occurs as peaks in infrared data are cut off into an assigned plateau value so that the display allocation emphasizes smaller features of interest in the scene and remains immune to flicker noise.

11 Claims, 2 Drawing Sheets

NOISE IMMUNE AUTOMATED CONTRAST CONTROL FOR INFRARED CAMERAS

CROSS-REFERENCE TO RELATED APPLICATION

This application is a continuation-in-part of Application Ser. No. 07/728,907 filed on 9 Jul. 1991 and now issued to Silverman et al as U.S. Pat. No. 5,249,241, the disclosure of which is incorporated herein by reference.

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to infrared (IR) cameras, and more specifically the invention pertains to an automated contrast control system and process which automatically optimizes, tracks changes in luminance and adjusts in real time the contrast of digital IR data for the display of wide dynamic range imagery from IR cameras.

The best art is represented in the pending parent patent application, Ser. No. 07/728,907 which is incorporated herein by reference which described the use of a Histogram Projection (HP) system which is used for the real-time mapping from the 12-bit raw camera signals to 8-bit display values, a mapping which is updated with each incoming frame. The need for such an automated display (hands-off operation) for IR cameras with the conversion of IR data from 12 bits to 8 bits is critical especially for field operation. Most IR cameras are 12 bit systems, and most monitors are inexpensive 8 bit systems. The use of 12 bit monitors is rare, and to purchase one is expensive.

While in general this approach has worked very well, one characteristic problem noticed in our laboratory and elsewhere is the presence of "flicker" noise for very "bland" thermal scenes. By bland thermal scenes, we refer to very low contrast IR images (often the case indoors with no warm objects in the field-of-view) with few of the 12-bit levels occupied in any one frame (say 50 or less out of 4095 possibly occupied levels.) For such scenes, slight variations in the numbering of the occupied levels from frame to frame can result in mean display level shifts for the bulk of the pixels noticeable to the eye as a flicker or shift in overall brightness of the display from moment to moment. A new system that is similar to the HP system but more robust with regard to flicker noise is the subject of this invention.

The task of providing an automated contrast control system which automatically tracks changes in luminance to adjust the display of wide dynamic range IR imagery is alleviated, to some extent, by the systems disclosed in the following U.S. Patents, the disclosures of which are incorporated herein by reference:

U.S. Pat. No. 4,656,665 issued to Pennebaker;
U.S. Pat. No. 4,670,653 issued to McConkle;
U.S. Pat. No. 4,719,350 issued to Alm;
U.S. Pat. No. 4,741,046 issued to Matsunawa; and
U.S. Pat. No. 4,856,528 issued to Yang.

The patent to Pennebaker describes a system for thresholding images to reduce the information content using histogram analysis. The patent to McConkle teaches an infrared detection and imaging system. The patent to Alm describes a radiation imaging enhancement system employing a feedback loop to obtain an average value detection signal and a reference signal. The patent to Matsunawa teaches a histograming method discriminating picture wherein the picture is binary coded. The patent to Yang teaches a histograming method in a CT image in medical applications.

It is common for IR cameras to rely on manual gain and offset adjustment to obtain a real-time control of the contrast of IR signals before the display values are sent to a monitor. The manual adjustment gives an excellent view in general of the useful IR information in a scene, but it requires frequent readjustment as the camera is panned or if the IR luminance changes (sun goes behind a cloud for example). Moreover as a linear process, the manual offset/gain expends, so to speak, useful dynamic range on empty levels within the histogram or information range on empty levels within the histogram or information range of the IR levels. Two alternative candidates, which we have considered, for implementing automatic adjustments of IR data are direct scaling and histogram equalization.

Direct scaling (also called "black level and gain") requires that the histogram of each frame be analyzed to set a "black" and "white" level. The optimum way to do this requires either a user interactive parameter in the implementation or a plethora of choices. In either case, more complexity is involved than with the new technique described below. Further, as with the manual adjustment to which it is closely analogous, one is still faced with the disadvantage cited above for linear process.

The familiar technique, described in text books, of "histogram equalization" assigns dynamic range to each occupied level in proportion to how many pixels are at that level. Extensive simulations in software on actual imagery: indoor and outdoor; day and night, show that due to the nature of IR histograms, histogram equalization amplifies shot noise and loses gray scale resolution for smaller (usually hotter) objects in the scene. The purpose of the present invention is to avoid this pitfall without manual control.

SUMMARY OF THE INVENTION

The present invention includes an automated contrast control system which uses an infrared camera, a microprocessor, and an 8 bit monitor to display the IR scenes with automatic control of the contrast of the IR data. The camera acquires IR data which is digitized for the microprocessor. The microprocessor processes the IR data with a plateau equalization program to output digital IR data for the monitor with controlled contrast. The monitor displays the output of the microprocessor.

The new system uses plateau equalization (PE) as one of several ways to "hybridize" or blend the display properties of HP and the well known display approach of Histogram Equalization (HE). The earlier patent application cited above described the main difference between HP and HE as a display vehicle. Namely, HP acts to reserve equal display range for each occupied pixel value in the scene, regardless of how many pixels are at that raw signal value. As such, it optimizes image detail for smaller objects in the scene. HE assigns display range on the basis of how many pixels are at the various occupied values and as such gives main display emphasis to heavily occupied levels which typically represent pixels on the background such as sky, ground or foliage. PE is computationally a close cousin of HE but it is close to HP in display properties. In HE, one uses all the raw signal values of each frame to form a fractional cumulative probability distribution. In PE, one uses only a subset of the raw signal values for each frame. To wit, one chooses a small fixed integer such as 10, 20 or 30 as a "plateau" or saturation level and freezes the count at that value. In other words, if a raw signal level reaches this count value in reading in the histogram, its value in the histogram distribution is frozen at that maximum value. (At the extreme choices of one or the total number of image pixels, this new approach of plateau equalization is equivalent to HP or HE, respectively.)

When described as a process, the present invention includes a three step approach to automatically control the contrast for IR data for display without resorting to manual offset and gain adjustment. The first step of the process entails acquiring digital IR data that pertains to a scene of interest.

The second step entails evaluating the IR data to form a histogram count up to a fixed plateau level of the current scene or frame.

The third step entails using the plateau equalization technique described above with the microprocessor to output contrast controlled data with improved noise immunity and display quality.

It is an object of the present invention to provide an automated contrast control device in infrared cameras with improved noise immunity.

It is an object of the present invention to provide an IR data processing system with an adjustable allocation of contrast.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes an automated contrast control system for adjusting "raw" scene data of IR cameras to produce a display scene data stream which automatically optimizes and adjusts the contrast in response to changes in luminance in order to display a wide dynamic range of IR imagery. The principle of the present invention in its purest form is to provide the automatic tracking and optimization of the scene information and the capability to gradually and automatically increase the dynamic range assigned to the majority pixel levels (typically the background such as foliage or ground) by incorporating a user choice of the plateau level (rather than the subsampling rate as in the earlier patent application cited above). However the main new advantage of this invention is the improved flicker noise immunity. The mean display level is now more stable for bland (few levels) scenes than was the case for the automated display based on HP.

Figure 1:
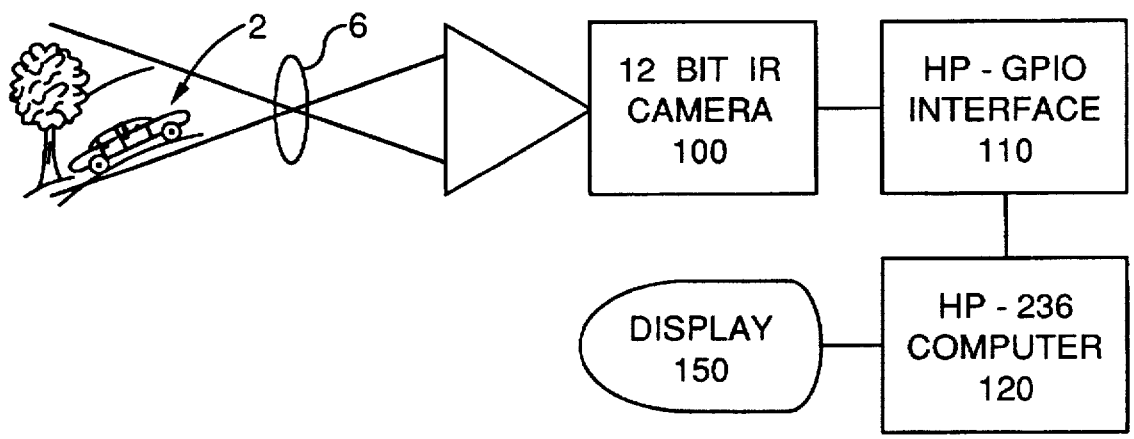
FIG. 1 is an illustration of the infrared signal processing system elements used in the present invention.

The reader's attention is now directed towards FIG. 1, which is a block diagram of an IR signal processing system which uses the present invention.

Figure 2:
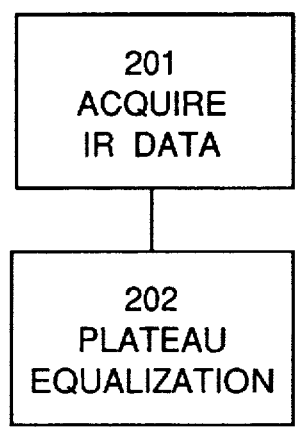
FIG. 2 is an illustration of the present invention of the automated contrast control process of the present invention.

In FIG. 1, an image 2 is focused through a lens 6 into an IR camera 100. This camera can be any commercially available system such as one produced by the David Sarnoff Research Labs of New Jersey. The analog electrical output of the camera 100 is converted into a digital signal by the interface 110 for the computer 120. The system of FIG. 1 with the computer 120 performs a two step process shown in FIG. 2 to automatically adjust the contrast of raw data into a display signal for the display monitor 150. First, it acquires digital IR data that pertains to a scene of interest 201.

The second step 202 entails using the plateau equalization algorithm described above with the microprocessor to output contrast controlled data with improved dynamic range. Note that displaying the IR signals with adjusted contrast can be considered a third step of the process.

As mentioned above, the new plateau equalization approach is one of several ways to "hybridize" or blend the display properties of HP and the well known display approach of Histogram Equalization (HE). The earlier patent application cited above described the main difference between HP and HE as a display vehicle. Namely, HP acts to reserve equal display range for each occupied pixel value in the scene, regardless of how many pixels are at that raw signal value. As such, it optimizes image detail for smaller objects in the scene. HE assigns display range on the basis of how many pixels are at the various occupied values and as such gives main display emphasis to heavily occupied levels which typically represent pixels on the background such as sky, ground or foliage. PE is computationally a close cousin of HE. In the latter, one uses all the raw signal values of each frame to form a fractional cumulative probability distribution. In PE, one uses only a subset of the raw signal values for each frame. To wit, one chooses a small fixed integer such as 10, 20 or 30 as a "plateau" or saturation level and freezes the count at that value. In other words, if a raw signal level reaches this count value in reading in the histogram, its value in the histogram distribution is frozen at that maximum value.

A computer program (see Table 1) implements the PE system in software. The initial step of histograming is to count the number of pixels at the various allowed raw signal values (e.g. 0 to 4095 for 12-bit data), not incrementing any counts beyond the chosen plateau level. If the total count for a complete frame is No with NO<N where N is the number of pixels in the image (For HE, NO=N), the desired discrete cumulative probability distribution is formed as follows:

$$F_1 = N_1/N_0$$
$$F_2 = (N_1 + N_2)/N_0$$
$$F_j = (N_1 + N_2 + N_j)/N_0$$

and for 8-bit displays, a pixel whose raw signal values is at the $j^{th}$ occupied level is displayed as:

DISPLAY VALUE=255×$F_j$

For bland scenes, the previous system (Histogram Projection, HP) is subject to rapid fluctuations in the mean intensity of the display. The source of the fluctuations is the noise inherent in all imaging devices. For such very low contrast scenes, the noise causes the number of occupied gray levels below or above the mean values to fluctuate. Even though few pixels are involved, the HP algorithm is dependent on the order number of occupied levels. Hence this small fluctuation has a large effect on the mapping and on the mean display level if we are in the realm where the number of occupied levels is small.

HE is insensitive to this effect since it weights the output mapping by the number of pixels at each intensity level. If HE yielded a more acceptable display of the image, it would be an excellent solution to the flicker problem.

Figure 3:
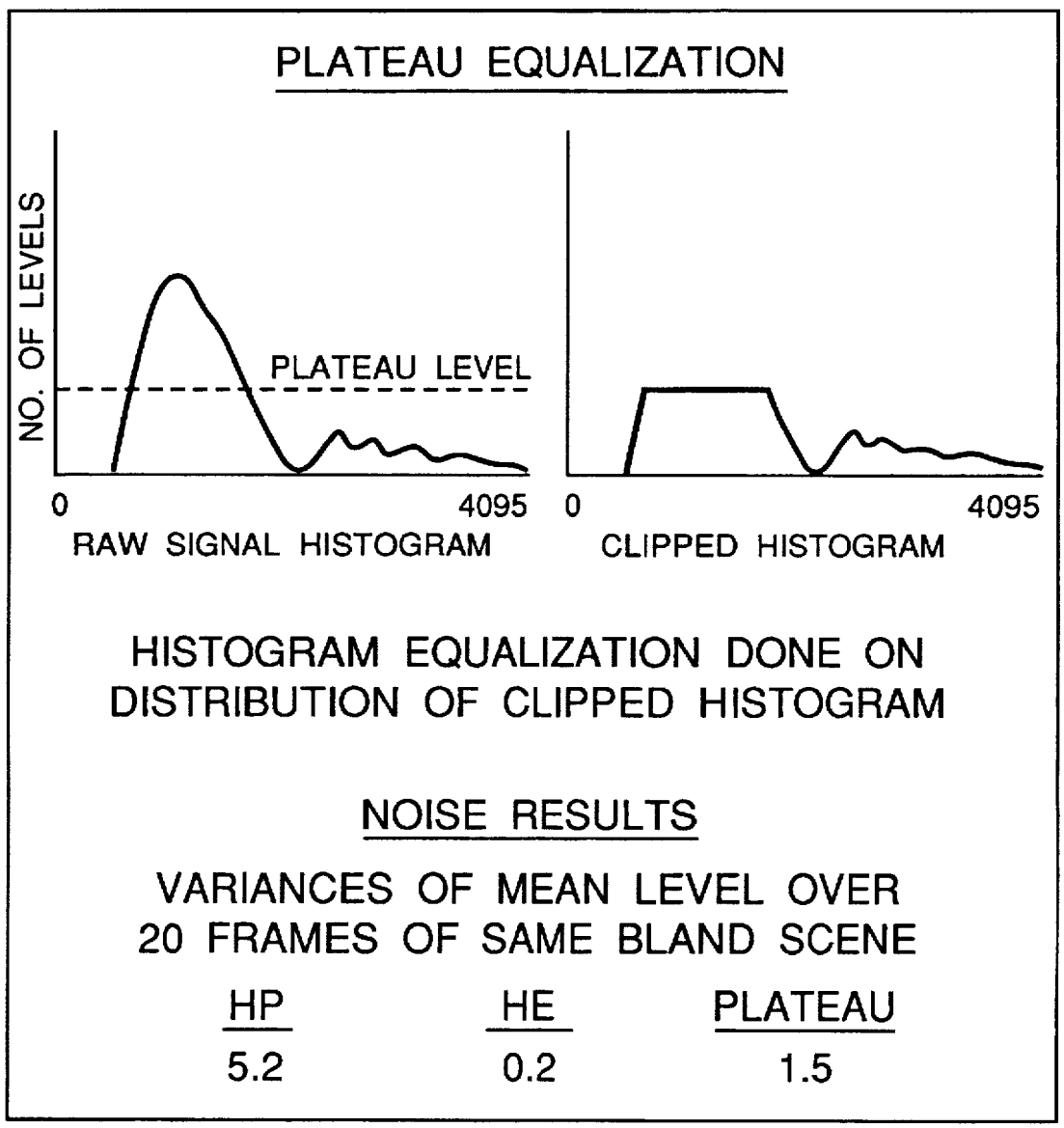
FIG. 3 is an example of the plateau equalization.

That the displays of PE can vary smoothly from those characteristic of HE to those of characteristics HP simply by adjusting the plateau value suggests its potential for controlling the flicker problem while maintaining a useful mapping of the image. To verify this hypothesis, we implemented the PE algorithm in software; then used Gaussian random numbers to simulate bland scenes (low contrast imagery); and proceeded to measure the variation in the mean output level for various plateau values ranging from one (HP) to the number of pixels in the image (HE). FIG. 3 is an illustration of the PE technique and summarizes the overall noise improvement obtained.

TABLE 1

SAMPLE PROGRAM

```
do_plateau(image, plateau) int *image, plateau;
{
    int i, *ehist, elut, ndly, edisp, esum:
    ehist = (int *) calloc(max_intensity_level, size of (int));
    elut = (int *) calloc(max_intensity_level, size of (int));
    ndlv = number_of_pixels;
    for(i = number_of_pixels; i--;) /* create a plateaued histogram */
    {
        (ehist[*image] == plateau) ? ndlv-- : ehist[*image]++;
        image++;
    }
    printf("the value of the total aggregate is: %d ",ndlv);
    image -= number_of_pixels;
    esum = edisp = 0;
    for(i = max_intensity_level; i--;)
    {
        esum +=*ehist++<,8; /* max output gray level is 256 */
        while (esum >=ndlv) /* This loop does the division by */
        {                    /* repeated substractions */
            esum -= ndlv;
            edisp++;
        }
        *elut++= edisp;   /* write display mapping to look up table */
    }
    ehist -= max_intensity_level; elut -= max_intensity_level;
    for(i = number_of_pixels; i--;)
    {
        *image = elut[*image];  /* map the input intensity levels to */
        image++;   /* output gray levels */
    }
    cfree(ehist); cfree(elut); }
```

An example of a software code that implements the process of the present invention is given in Table 1. The particular software embodiment reflects the functionality of the hardware implementation in that divisions are replaced by repeated subtractions.

Our hardware implementation of the PE system is performed in three parts: 1) determine the clipped histogram with the plateau cutoff; 2) perform the mapping from 12 to 8 bits and write the look-up table; 3) map the input data to the output data through the look-up table.

With the start of a new frame, the gray level of each pixel is used as the address to a 4096 by 16 RAM which stores the histogram. The RAM is read to determine if the gray level count has exceeded the plateau cutoff level. If not, the occupancy counter is incremented and the histogram RAM is also incremented. After a predetermined number of pixel values have been read, the function of the processor switches over to the projection or mapping step, at which time the total aggregate count (No from above) is stored in the occupancy counter.

In the first steps of the plateau mapping, the display counter is reset; the gray level counter is reset; and the accumulator is cleared. The gray level counter then begins counting up from 0 to 4095. The output from the gray level counter is used to address the plateau histogram RAM. The data from the RAM is bit shifted eight places to the left equivalent to multiplication by 256) and added to the value stored in the accumulator latch. After the data is latched in the accumulator, the value of the total aggregate is subtracted from it. If the difference is positive, the new value is latched by the accumulator, the display level counter is incremented and another subtraction of the aggregate value is performed. Every time the difference is positive, the new value is latched by the accumulator and the display level counter is incremented. Once the difference is negative, the subtractions are suspended, the value of the display level counter is written to one of the display RAMs, the gray level counter is incremented, and the process resumes.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. An IR signal processing system which provides automatic contrast control of IR data signals to produce adjusted optimized display signals which have adjusted contrast and are immune to flicker noise, said IR signal processing system comprising:

a means for producing said IR data signals;

a means for adjusting contrast of said IR data signals to output said adjusted display signals with plateau equalization in levels of intensity thereby, said adjusting means being electrically connected with said producing means to receive said IR data signals therefrom, said adjusting means being capable of selectively identifying peaks in the IR data signals and clipping off said peaks to produce thereby an enhanced contrast in said adjusted display signals; and a means for displaying said adjusted display signals, said displaying means being electrically connected with said adjusted means to receive said adjusted display signals therefrom.

2. An IR signal processing system, as defined in claim 1, wherein said producing means includes an infrared camera which outputs said IR data signals.

3. An IR signal processing system, as defined in claim 2, wherein said adjusting means comprises a microprocessor which has been programmed with a plateau equalization program which causes said microprocessor to determine a histogram by counting all occupied levels in said IR data signals and determining therefrom an identification of peaks in IR data, said microprocessor then adjusting contrast of the IR data signals with said plateau equalization program to output thereby said adjusted display signals with said adjusted contrast.

4. An IR signal processing system, as defined in claim 1, wherein said adjusting means comprises a microprocessor which has been programmed to process data with a plateau equalization program which causes said microprocessor to determine a histogram by counting all occupied levels in said IR data signals and determining therefrom an identification of peaks in IR data, said microprocessor then adjusting contrast of the IR data signals with said plateau equalization program to output thereby said adjusted display signals with said adjusted contrast.

5. An IR signal processing system, as defined in claim 1, wherein said producing means comprises a 12 bit IR camera, and wherein said displaying means comprises a 8 bit monitor.

6. An IR signal process which provides automatic adjustments of contrast of IR data signals to produce optimized adjusted display signals which have adjusted contrast and are immune to flicker noise, said IR signal process comprising the steps of:

producing said IR data signals;

adjusting the contrast of said IR data signals by clipping off peaks in said IR data signals of plateau levels to output said adjusted display signals thereby; and displaying said adjusted display signals.

7. An IR signal process, as defined in claim 6, wherein said producing step comprises producing said IR data signals with an infrared camera, and wherein said adjusting step is accomplished by entering said IR data signals into a microprocessor which has been programmed with a plateau equalization program, which includes:

```
do_plateau(image, plateau) int *image, plateau;
{
    int i, *ehist, elut, ndly, edisp, esum:
    ehist = (int *) calloc(max_intensity_level, sizeof (int));
    elut = (int *) calloc(max_intensity_level, sizeof (int));
    ndlv = number_of_pixels;
    for(i = number_of_pixels; i--;) /*create a plateaued histogram */
    {
        (ehist[*image] == plateau) ? ndlv -- : ehist[*image]++;
        image++;
    }
    printf("the value of the total aggregate is: %d ",ndlv);
    image -= number_of_pixels;
    esum = edisp = 0;
    for(i = max_intensity_level; i--;)
    {
        esum +=*ehist++<,8; /* max output gray level is 256 */
        while (esum >=ndlv) /* This loop does the division by */
        {                   /* repeated substractions */
            esum -= ndlv;
            edisp++;
        }
        *elut++= edisp; /* write display mapping to look up table */
    }
    ehist -= max_intensity_level; elut -= max_intensity_level;
    for(i = number_of_pixels; i--;)
    {
        *image = elut[*image];  /* map the input intensity levels to */
        image++;                /* output gray levels */
    }
    cfree(ehist); cfree(elut); }
```

8. An IR signal process which provides automatic adjustments of contrast of IR data signals to produce optimized adjusted display signals which have adjusted contrast are immune to flicker noise, said IR signal process comprising the steps of:

producing said IR data signals;

adjusting the contrast of said IR data signals by clipping off the peaks of histogram in said IR data signals of plateau levels to output said adjusted display signals thereby.

9. An IR signal process, as defined in claim 8, wherein said producing step comprises producing said IR data signals with an infrared camera, and wherein said adjusting step is accomplished by entering said IR data signals into a microprocessor which has been programmed with a plateau equalization program, which includes:

```
do_plateau(image, plateau) int *image, plateau;
{
    int i, *ehist, elut, ndly, edisp, esum:
    ehist = (int *) calloc(max_intensity_level, sizeof (int));
    elut = (int *) calloc(max_intensity_level, sizeof (int));
    ndlv = number_of_pixels;
```

-continued

```
    for(i = number_of_pixels; i--;) /* create a plateaued histogram*
    {
        (ehist(*image) == plateau) ? ndlv -- : ehist[*image]++;
        image++;
    }
    printf("the value of the total aggregate is: %d ",ndlv);
    image -= number_of_pixels;
    esum = edisp = 0;
    for(i = max_intensity_level; i--;)
    {
        esum +=*ehist++<,8; /* max output gray level is 256 */
        while (esum >=ndlv) /* This loop does the division by */
        {                   /* repeated substractions */
            esum -= ndlv;
            edisp++;
        }
        *elut++= edisp; /* write display mapping to look up table */
    }
    ehist -= max_intensity_level; elut -= max_intensity_level;
    for(i = number_of_pixels; i--;)
    {
        *image = elut[*image];  /* map the input intensity levels to *
        image++;       /* output gray levels */
    }
    cfree(ehist); cfree(elut); }.
```

10. An IR signal process, as defined in claim 9, wherein said infrared camera used in said producing step comprises a 12 bit camera, and wherein said adjusted display signals are displayed by an 8 bit monitor.

11. An IR signal Processing system which provides automatic contrast control of IR data signals to produce adjusted optimized display signals which have adjusted contrast and are immune to flicker noise, said IR signal processing system comprising:

a means for producing said IR data signals;

a means for adjusting contrast of said IR data signals to output said adjusted display signals with plateau equalization in levels of intensity thereby, said adjusting means being electrically connected with said Producing means to receive said IR data signals therefrom, said adjusting means being capable of selectively identifying peaks in the IR data signals and clipping off said peaks to produce thereby an enhanced contrast in said adjusted display signals wherein said adjusting means comprises a microprocessor which has been programmed to process data with a plateau equalization program which causes said microprocessor to determine a histogram by counting all occupied levels in said IR data signals and determining therefrom an identification of peaks in IR data, said microprocessor then adjusting contrast of the IR data signals with said plateau equalization program to output thereby said adjusted display signals with said adjusted contrast, wherein said microprocessor comprises a digital computer which has been programmed with said plateau equalization program which includes:

```
do_plateau(image, plateau) int *image, plateau;
(
    int i, *ehist, elut, ndly, edisp, esum:
    ehist = (int *) calloc(max_intensity_level, size of (int));
    elut = (int *) calloc(max_intensity_level, size of (int));
    ndlv = number_of_pixels;
    for(i = number_of_pixels; i--;) /* create a plateaued
    histogram */
    (
        (ehist[*image] == plateau) ? ndlv == : ehist[*image]++;
        image++;
```

```
)
printf("the value of the total aggregate is: %d ",ndlv);
image -= number_of_pixels;
esum = edisp = 0;
for(i = max_intensity_level; i—;)
(
    esum +=*ehist++<,8; /* max output gray level is 256 */
    while (esum >+ndlv) /* This loop does the division by */
    (                   /* repeated substractions */
        esum -= ndlv;
        edisp++'
    )
    *elut++ = edisp; /* write display mapping to look up table
    */
)
ehist -= max_intensity_level; elut -= max_intensity_level;
```

```
for (i = number_of_pixels; i—;)
(
    *image = elut[*image];  /* map the input intensity
    levels to */
    image++;            /* output gray levels */
)
cfree(ehist); cfree(elut); );
``` and a means for displaying said adjusted display signals, said dissolving means being electrically connected with said adjusting means to receive said adjusted display signals therefrom.

* * * * *